United States Patent
Sica

Patent Number: 5,888,260
Date of Patent: Mar. 30, 1999

[54] HIGH PERFORMANCE AUTOMOTIVE AIR INTAKE

[76] Inventor: Gerardo Sica, 17221 Airport Road, Caledon East, ON, Canada, L0N 1E0

[21] Appl. No.: 850,618

[22] Filed: May 2, 1997

[51] Int. Cl.⁶ ..................................................... B01D 46/00
[52] U.S. Cl. ..................... 55/331; 55/385.3; 55/391; 55/463; 55/521; 55/529; 55/DIG. 28; 55/DIG. 30
[58] Field of Search ................... 55/331, 385.3, 55/391, 392, 463, 521, 529, DIG. 28, DIG. 30

[56] References Cited

U.S. PATENT DOCUMENTS

| | | | |
|---|---|---|---|
| 3,771,638 | 11/1973 | Schneider et al. | 55/529 |
| 3,870,495 | 3/1975 | Dixson et al. | 55/521 |
| 3,872,012 | 3/1975 | Endicott | 55/331 |
| 4,157,902 | 6/1979 | Tokar | 55/331 |
| 4,702,754 | 10/1987 | Blocker | 55/529 |
| 5,125,940 | 6/1992 | Stanhope et al. | 55/385.3 |
| 5,522,909 | 6/1996 | Haggard | 55/521 |
| 5,549,724 | 8/1996 | Mochida | 55/521 |
| 5,632,793 | 5/1997 | Haggard | 55/502 |

Primary Examiner—Jay H. Woo
Assistant Examiner—Minh-Chau T. Pham
Attorney, Agent, or Firm—D. W. Eggins; Douglas Eggins

[57] ABSTRACT

A high performance air intake for an automotive engine has an oiled gauze filter of inverted conical form, including an inverted, shaped inner apex, the filter fitting within an in-line filter body that forms a part of a slender intake line. The in-line form of the filter enables the pick-up of intake air from a cool zone below the engine, with little subsequent heating of the air, resulting in enhanced breathing of the engine, with observable performance enhancement.

6 Claims, 1 Drawing Sheet

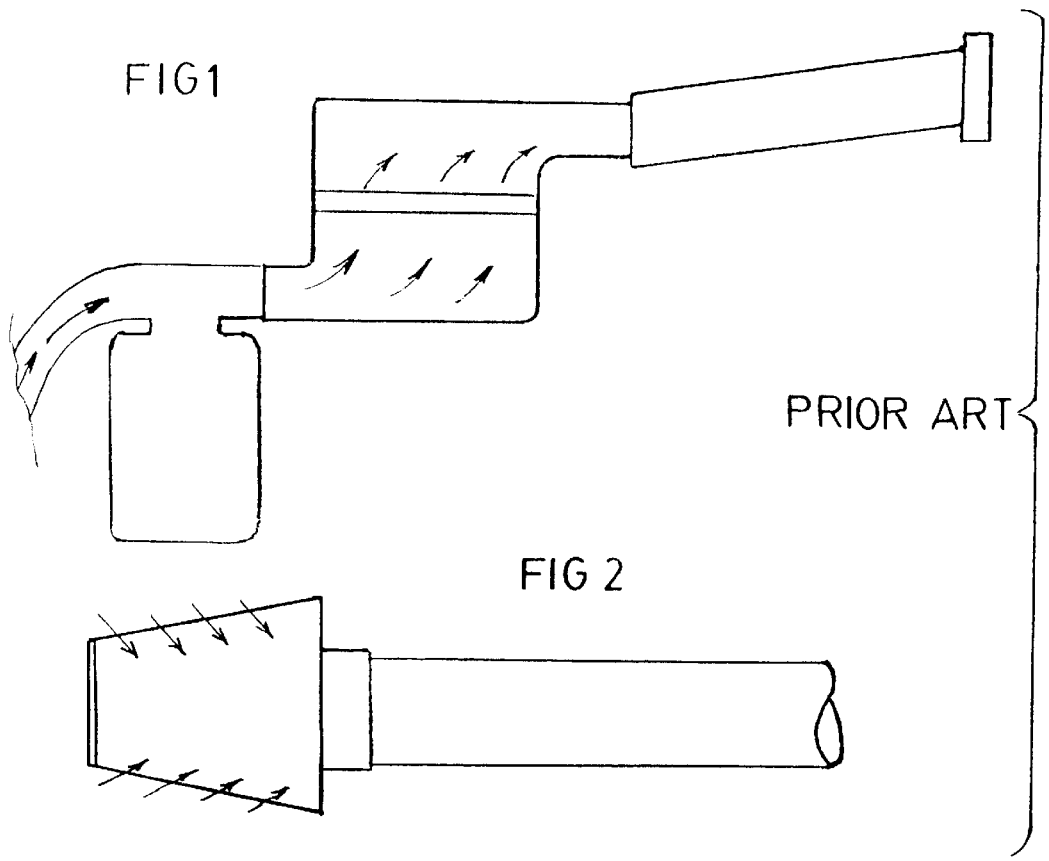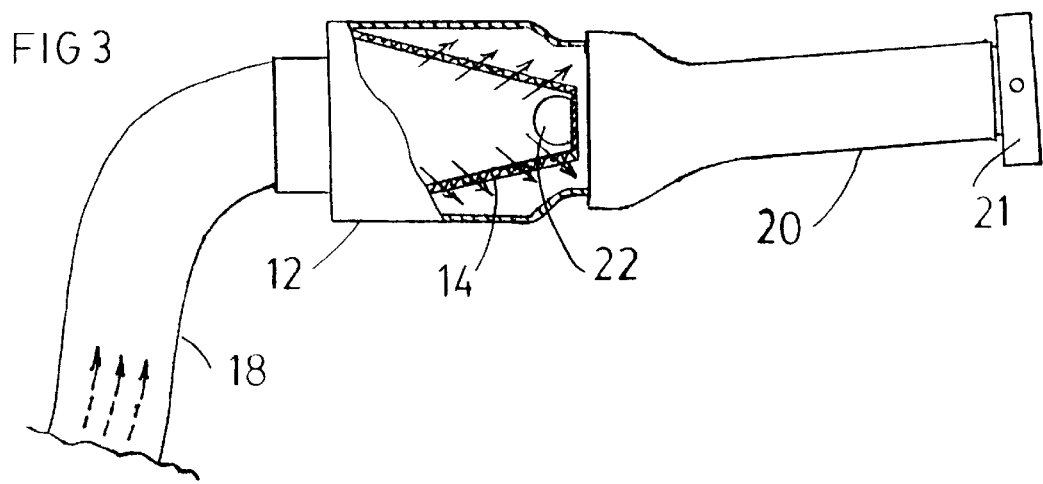

HIGH PERFORMANCE AUTOMOTIVE AIR INTAKE

BACKGROUND OF THE INVENTION

1. Field of the Invention

This invention is directed to an air filter, and in particular to an air intake filter for an automobile engine.

2. Description of the Prior Art

In the operation of automobile engines, particularly in the case of high performance engines, a great deal of attention is focussed on the "breathing" of the engine.

In the case of naturally aspirated, "unblown" engines, in which a supercharger is absent, the effective inflow of air into the cylinders significantly influences the performance of the engine. For that reason much effort has focussed on the polishing of valve ports, the degree and timing of valve lift, tuning of the length of intake passages in relation to the location of air flow pressure nodes etc, in order to optimize air flow.

To protect the engine against undue wear it is necessary to filter the incoming air, in order to remove abrasive particles that would polute and damage various portions of the engine.

In many instances, in high performance machines, a filter box of generally rectangular section is provided, having a filter of large cross-sectional area that produces low velocity air flow, with a small presure drop across the filter element. This is thought to improve the breathing performance of the engine.

A major disadvantage of this arrangement is that the filter box is located high up in the engine compartment, and consequently is heated to a significant degree, so as to form an effective heater of the slow moving air within the filter box, thereby effectively reducing the volumetric efficiency of the engine. An existing form of air filter has a conical shaped filter of accordion-pleated, air permeable filter material. The conical filter is aranged with the apex of the cone located upstream, so that air flows from the outside of the cone, inwardly through the divergently inclined filter wall.

SUMMARY OF THE INVENTION

The present invention provides an air filter for use in an automobile air induction system, comprising a slender filter housing having an inlet and an outlet in mutual, substantially aligned relation; a filter comprising an air permeable wall of convergent form, forming a convergent, progresssively diminishing flow path within the permeable wall.

The use of a housing of substantially uniform cross section provides a divergent, progressively increasing flow path outside the filter wall, in use to receive air from within the filter, for passage to the engine.

In one embodiment the filter air-permeable wall member comprises a substantially conical form, having the apex portion of the filter member adjacent the outlet, and the larger diameter base portion adjacent the inlet, in use to receive incoming air within the conical form, for passage thereof outwardly through the filter wall to the outlet.

In one embodiment of the filter an air guide is located within the cone adjacent the apex portion, in use to deflect incoming air within the cone in a direction outwardly, through the wall. A commercial conical filter of accordion-pleated cotton construction has been effectively used as the filter element, with a substantially hemispherical air guide located at the apex. The air filter housing used may be substantially cylindrical. The air filter can be used in combination with an air inlet pipe connected to a cool location in the vicinity of the engine, e.g. within the engine compartment.

In one embodiment, the air inlet comprises a drop pipe extending downwardly to a cool location below the engine.

The outlet pipe from the filter to the engine throttle body connection of one embodiment is of a lesser diameter than the air inlet pipe.

BRIEF DESCRIPTION OF THE DRAWINGS

Certain embodiments of the present invention are described, by way of illustration, without limitation of the invention thereto other than as set forth in the claims hereof, reference being made to the accompanying drawings, wherein;

FIGS. 1 and 2 are schematic views in side elevation of Prior Art automotive air filter arrangements;

FIG. 3 is a side elevation in part-section of a first embodiment of an air filter arrangement in accordance with the present invention.

DESCRIPTION OF THE PREFERRED EMBODIMENTS

Referring first to FIGS. 1 and 2, which are of the Prior Art:

In FIG. 1, which shows a standard high performance car air intake, the filter housing is divided by a planar filter element of large area, through which the air passes, to exit by way of an air passage to the throttle body of the engine intake system. FIG. 2 shows a conical air filter fitted by way of a rubber flange to the manifold inlet pipe, wherein the incoming air impinges on the outside surface of the filter element, passes inwardly through the divergent conical filter wall, and exits through the base of the element to the manifold pipe.

Turning to FIG. 3, in an embodiment in accordance with the present invention an air filter 10 has a substantially cylindrical housing 12 which contains a conical filter element 14. The filter element 14 is accordion pleated, being of cotton gauze material, and being washable.

In one embodiment, a filter element 14 of four and one quarter inch base diameter (108 mm), by five and one half inches long (140 mm), and two inches diameter (51 mm) at the apex, is located within a five inch diameter (127 mm) housing 12 of polycarbonate plastic. The filter element 14 includes a rubber inlet sleeve connection of three inch diameter (76.2 mm) into which an aluminum inlet pipe 18 of three inch O.D.(76.2 mm) is inserted. An outlet pipe 20 of silicone rubber of two and one half inches I.D.(64 mm) connects the outlet of housing 12 to the engine throttle body 21.

A flow deflector 22 secured at the apex of the element 14 has been found to beneficially influence air throughput.

The deflector 22 actually used comprised substantially about 210 degrees of a hemisphere of sensibly one inch diameter (25.4 mm).

In operation, with the subject air filter installed on a 1991 Honda Civic. S.I. with a 4-cylinder 1.6 liter engine, the time to accelerate from 20 to 140 km per hour was 12 seconds. With the standard OEM filter, as illustrated in FIG. 1, the same acceleration test took 13 seconds, on the same course. During the testing of this vehicle, fitted with the subject filter, the engine gave no indication of any "flat-spots", and appeared to develope more power across the full performance spectrum, as compared with the OEM air filter. However the time trial was a definitive, quantified test which demonstrated a power increase resulting from use of the invention.

It was observed in operation that the outlet pipe connecting the filter to the engine ran significantly cooler than that of the stock car arrangement.

What I claim by Letters Patent of the United States is:

1. An air filter for use with an internal combustion engine air induction system, said filter comprising a slender, substantially cylindrical filter housing having an inlet and an outlet in mutual, substantially aligned relation; a filter member comprising an air permeable wall convergent relative to the direction of air flow and being of substantially conical form, with the apex portion of the filter member located adjacent the outlet of said housing, and the larger diameter base portion located adjacent the inlet of said housing, forming a convergent, progressively diminishing flow path within the permeable wall, and a divergent, progressively increasing flow path outside the air permeable wall, in use to receive air within the filter wall, for outward passage through the filter wall to said engine.

2. The air filter as set forth in claim 1, having an inverted air guide located within said conical form adjacent said apex portion, in use to deflect incoming air within said cone in a direction outwardly, through said permeable wall.

3. The air filter as set forth in claim 1, in combination with an air inlet pipe connected to a cool location in the vicinity of said engine.

4. The air filter as set forth in claim 2, in combination with an air inlet pipe connected to a cool location in the vicinity of said engine.

5. The air filter as set forth in claim 1, in combination with a said internal combustion engine.

6. The combination as set forth in claim 5, including a vehicle in driven relation with said engine.

* * * * *